United States Patent
Chen

(10) Patent No.: US 8,189,716 B2
(45) Date of Patent: May 29, 2012

(54) METHOD FOR OBTAINING PRECISE SAMPLING FREQUENCY OF GLOBAL POSITIONING SYSTEM (GPS)

(75) Inventor: Hung-Sheng Chen, Taipei County (TW)

(73) Assignee: Altek Corporation, Hsinchu (TW)

( * ) Notice: Subject to any disclaimer, the term of this patent is extended or adjusted under 35 U.S.C. 154(b) by 651 days.

(21) Appl. No.: 12/405,705

(22) Filed: Mar. 17, 2009

(65) Prior Publication Data
US 2010/0166045 A1    Jul. 1, 2010

(30) Foreign Application Priority Data
Dec. 26, 2008  (TW) .............................. 97150971 A

(51) Int. Cl.
*H03K 9/00* (2006.01)
*H04L 27/00* (2006.01)
(52) U.S. Cl. ........................................ 375/316; 375/149
(58) Field of Classification Search .................. 375/149, 375/316
See application file for complete search history.

(56) References Cited

U.S. PATENT DOCUMENTS

| | | | |
|---|---|---|---|
| 5,918,161 A * | 6/1999 | Kumar et al. | 455/65 |
| 6,311,129 B1 * | 10/2001 | Lin | 701/214 |
| 6,313,789 B1 * | 11/2001 | Zhodzishsky et al. | 342/357.68 |
| 6,934,322 B2 * | 8/2005 | King et al. | 375/150 |
| 7,706,429 B2 * | 4/2010 | Chen et al. | 375/147 |
| 2007/0205940 A1 * | 9/2007 | Yang et al. | 342/357.12 |

* cited by examiner

*Primary Examiner* — Chieh M. Fan
*Assistant Examiner* — Freshteh N Aghdam
(74) *Attorney, Agent, or Firm* — Morris Manning & Martin LLP; Tim Tingkang Xia, Esq.

(57) ABSTRACT

A method for obtaining a precise sampling frequency of a global positioning system (GPS) is applied in a GPS receiver. First, a radio frequency (RF) module of the GPS receiver is used to receive a satellite signal from at least one satellite. Then, a plurality of code delays of the satellite signal is calculated at a fixed time interval, and time differences between all adjacent two code delays among all the obtained code delays are calculated to obtain a plurality of time differences. Next, a mean value of all the obtained time differences is calculated. At last, a ratio between 1000 times of the mean value and the fixed time interval is calculated to obtain an error value, and the error is added to a standard sampling frequency of the RF module to obtain a new sampling frequency.

5 Claims, 4 Drawing Sheets

METHOD FOR OBTAINING PRECISE SAMPLING FREQUENCY OF GLOBAL POSITIONING SYSTEM (GPS)

CROSS-REFERENCE TO RELATED APPLICATIONS

This non-provisional application claims priority under 35 U.S.C. §119(a) on Patent Application No(s). 097150971 filed in Taiwan, R.O.C. on Dec. 26, 2008 the entire contents of which are hereby incorporated by reference.

BACKGROUND

1. Field of Invention

The present invention relates to a global positioning system (GPS), and more particularly, to a method for obtaining a precise sampling frequency of a GPS.

2. Related Art

A global satellite navigation system is also called a global positioning system (GPS). In the past, the GPS is only limited to military purpose and industrial purpose. With the continuous development of the technology, the GPS begins to be applied to various civil purposes. Generally, the GPS products mainly refer to GPS receivers applied to various purposes, for example, receivers for aviation and voyage purposes, automobile navigation devices, hand-held receivers for mountaineering and entertainment, and other types of communication products. The common GPS product mainly includes an internal antenna, a chipset, external keys, a display panel, and other related parts.

The GPS receiver utilizes satellites orbiting the earth for positioning. Generally, the GPS receiver needs to obtain signals from at least three satellites to calculate the longitude and latitude coordinates of a current position. When the GPS receiver needs to obtain the current position, the GPS receiver compares the time transferred from each satellite. These time differences may inform the GPS receiver of its distance away from each satellite, and therefore the current position is acquired.

The GPS receiver uses an oscillator, such as a temperature compensated crystal oscillator (TCXO), to serve as a reference frequency source required during operation. In other words, the GPS receiver uses the oscillator to generate the reference frequency.

However, as the oscillator is subjected to different manufacturing qualities, as well as the loss of the oscillator after being used for many times, a practically generated sampling frequency is not consistent with the designated sampling frequency given in a specification of the oscillator. In the prior art, when the satellite is tracked, errors of the sampling frequencies are compensated one by one at each data by using a delay locked loop (DLL). However, the GPS receiver consumes much time in the satellite tracking. Moreover, the application of the GPS receiver is limited.

SUMMARY OF THE INVENTION

In view of the problems above, the present invention is directed to a method for obtaining a precise sampling frequency of a GPS, thereby solving one or more problems generated by compensating errors of sampling frequencies one by one at each data in the prior art.

The present invention provides a method for obtaining a precise sampling frequency of a GPS, which is applied in a GPS (GPS) receiver. The GPS receiver has a radio frequency (RF) module.

First, the RF module of the GPS receiver is used to receive a satellite signal from at least one satellite.

A plurality of code delays of the satellite signal is calculated at a fixed time interval, and time differences between all adjacent two code delays among all the obtained code delays are calculated to obtain a plurality of time differences.

Next, a mean value of all the obtained time differences is calculated.

Finally, a ratio between 1000 times of the mean value and the fixed time interval is calculated to obtain an error value, and the error is added to a standard sampling frequency of the RF module to obtain a new sampling frequency.

The GPS receiver may further have a storage unit to store the obtained new sampling frequency.

Here, the standard sampling frequency of the RF module is a designated sampling frequency given in a specification of the RF module. The fixed time interval may be set to 1 ms (millisecond).

Moreover, a different satellite may be chosen at a different time to repeat the calculation of the code delays of the different satellite and the calculation of time differences of all the adjacent two code delays, so as to obtain a large amount of data (i.e., time differences) to calculate a mean value.

In conclusion, when the method for obtaining a precise sampling frequency of a GPS according to the present invention is applied in the GPS receiver, a more precise sampling frequency in comparison with the designated sampling frequency given in the specification may be provided for the GPS receiver, such that the GPS receiver may directly sample the satellite signal with the correct sampling frequency. In other words, the GPS receiver in which an embodiment of the present invention is applied may search samplings for the satellite signal with a more precise sampling frequency. In such a manner, a satellite tracking time of the GPS receiver may be effectively shortened and more precise time information may be obtained. Moreover, the GPS receiver may directly utilize the precise sampling frequency to perform more diversified satellite tracking modes, for example, hopping satellite tracking, rapidly searching code delay range at a warm start or a hot start of the GPS receiver, and so on.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
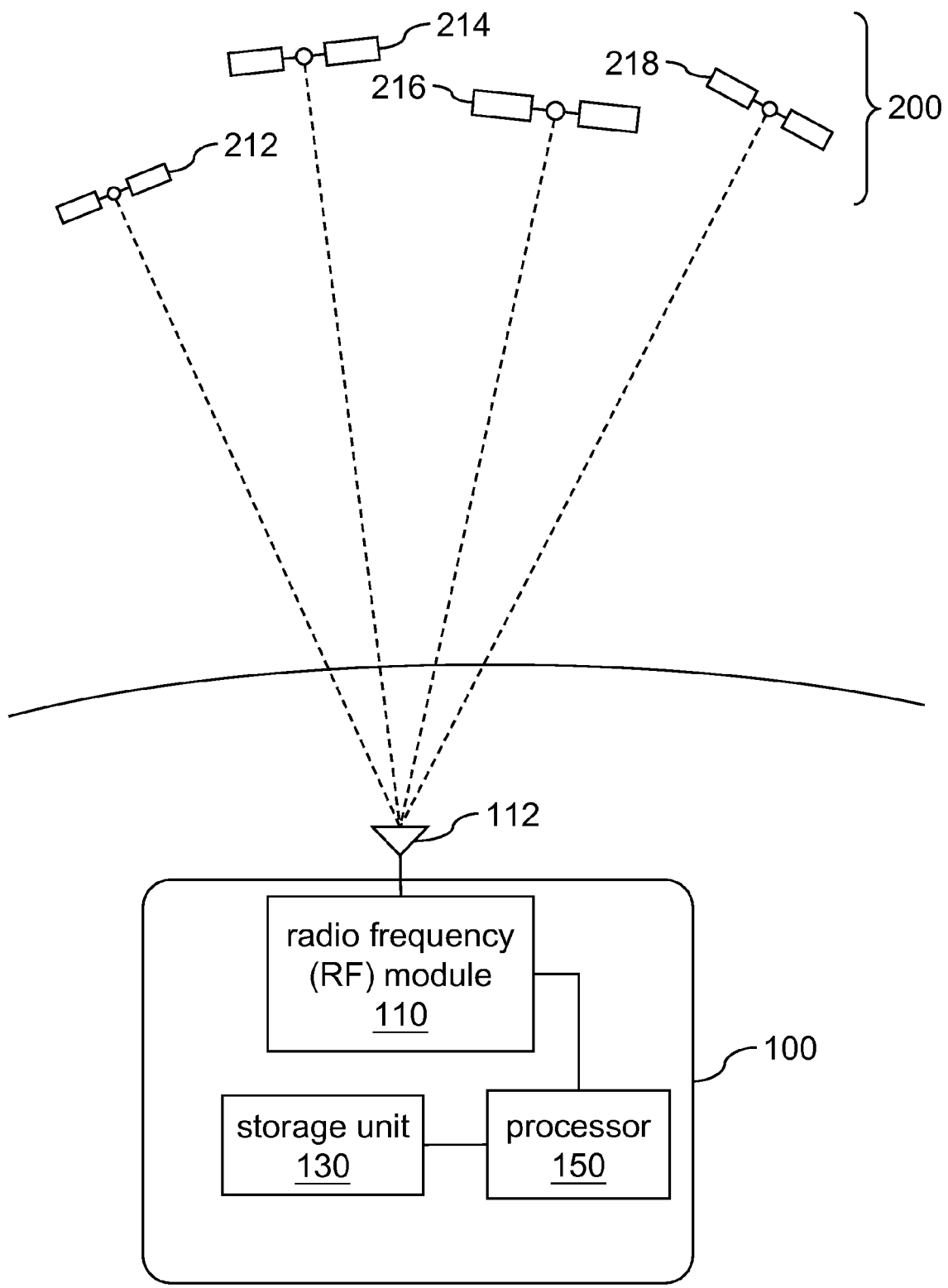
FIG. 1 shows a global positioning system (GPS) receiver in which an embodiment of the present invention is applied.
Figure 2:
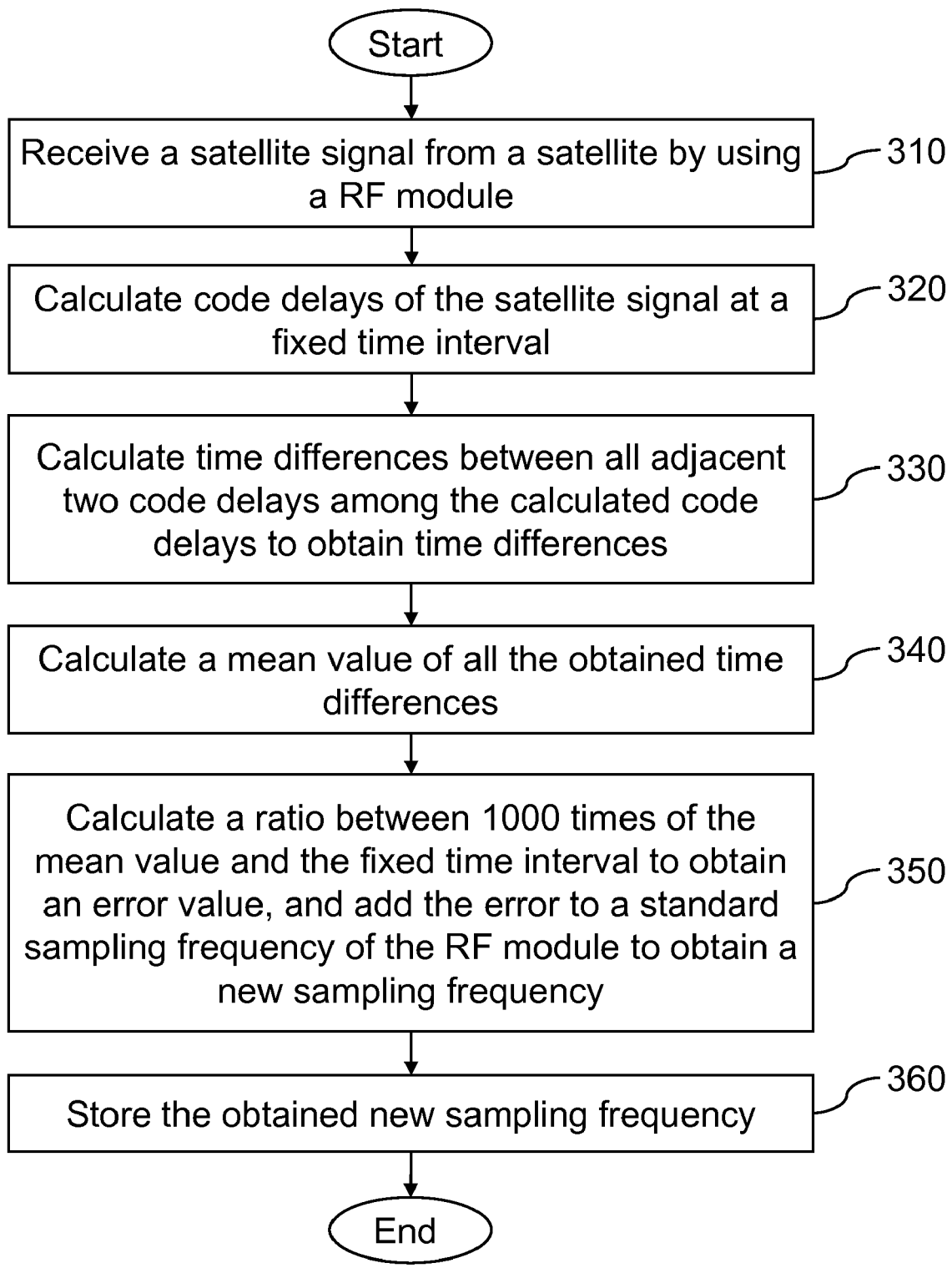
FIG. 2 is flowchart of a method for obtaining a precise sampling frequency of a GPS according to an embodiment of the present invention.

FIG. 1 shows a global positioning system (GPS) receiver in which an embodiment of the present invention is applied. FIG. 2 shows a method for obtaining a precise sampling frequency of a GPS according to an embodiment of the present invention.

Referring to FIGS. 1 and 2, the method for obtaining a precise sampling frequency of a GPS may be applied in a GPS receiver 100.

The GPS receiver 100 may be a single unit device, or may also be integrated with other apparatus, such as a mobile communication apparatus and a computer.

The GPS receiver 100 has a radio frequency (RF) module 110.

First, a satellite signal is received from a satellite 212 in an orbit satellite group 200 via an antenna 112 by using the RF module 110 of the GPS receiver 100 (step 310).

Next, a plurality of code delays of the satellite signal from this satellite 212 is calculated at a fixed time interval (step 320). That is, the code delay is calculated once every fixed time interval.

Also, time differences between all adjacent two code delays among all the code delays obtained in the previous step are calculated to obtain a plurality of time differences (step 330).

Next, a mean value of all the obtained time differences is calculated (step 340).

A ratio between 1000 times of the mean value and the fixed time interval is calculated to obtain an error value, and the error is added to a standard sampling frequency of the RF module to obtain a new sampling frequency, as shown in the following Formula 1 (step 350).

$$F'=F+\text{mean}(ds)\times 1000 \div dt \quad \text{Formula 1}$$

F' indicates the new sampling frequency, F indicates the standard sampling frequency, ds indicates a time difference between adjacent two code delays, mean (ds) adjacent a mean value of all the time differences between all adjacent two code delays, and dt indicates the fixed time interval.

Here, the standard sampling frequency of the RF module 110 is a designated sampling frequency given in a specification of the RF module 110. The fixed time interval may be set to 1 ms (millisecond).

Hence, the GPS receiver 100 may further have a storage unit 130 to store the obtained new sampling frequency (step 360).

In such a manner, when the GPS receiver 100 performs positioning, the stored new sampling frequency may be used to sample the satellite signal. Moreover, the GPS receiver 100 may also directly utilize a precise sampling frequency for more diversified satellite tracking modes, for example, hopping satellite tracking, or rapidly searching a code delay range during a warm start or a hot start, and so on.

Hence, a different satellite may also be chosen at a different time to repeat step 310, step 330, and step 350, so as to obtain a large amount of data (i.e., time differences) to calculate a mean value.

Figure 3:
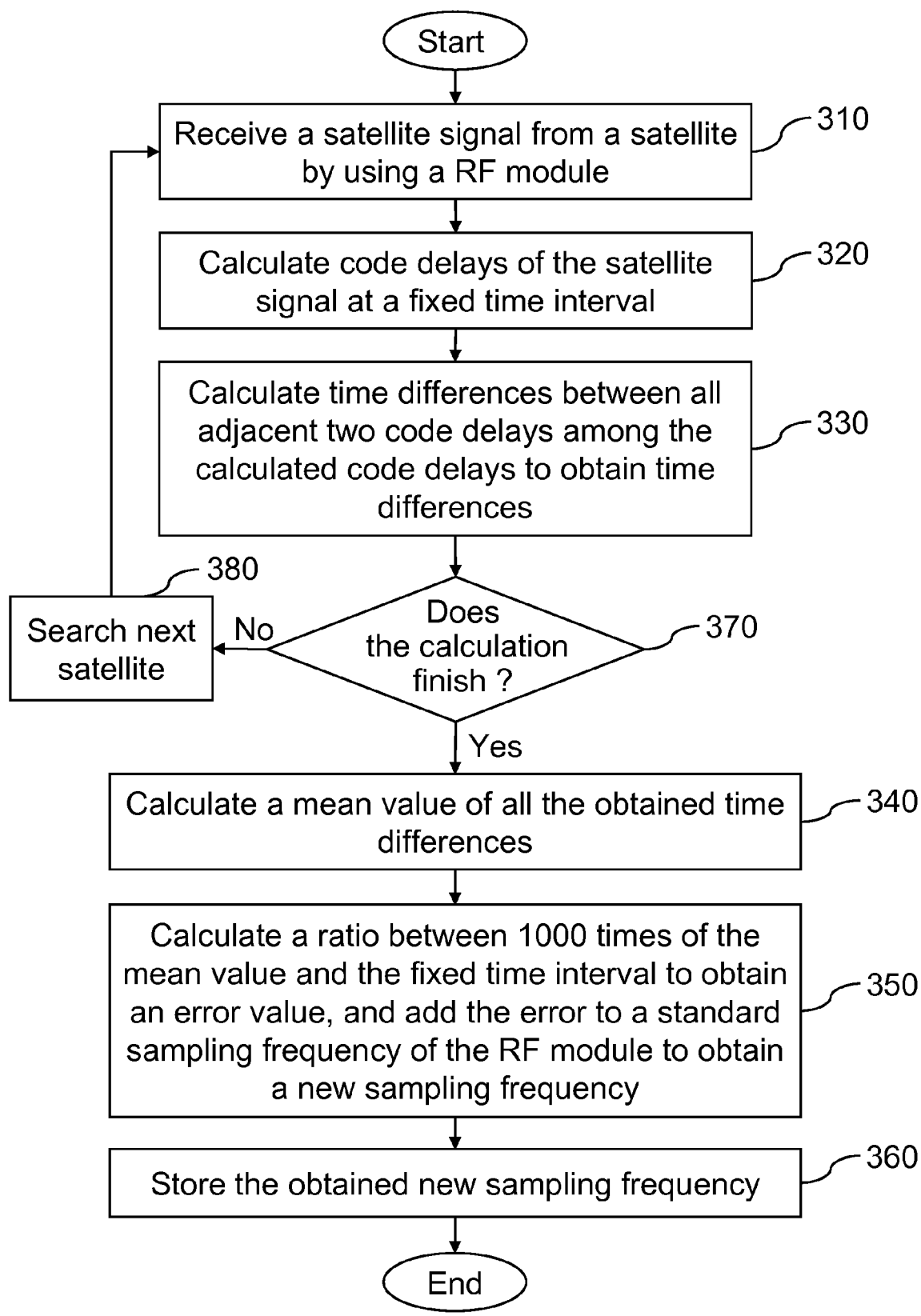
FIG. 3 is a flowchart showing a method for obtaining a precise sampling frequency of a GPS according to another embodiment of the present invention.

Referring to FIG. 3, after step 330 is completed, first it is decided whether the data amount is sufficient (step 370), that is, whether all the time differences are calculated or not.

Herein, whether all the time differences are calculated or not is determined by setting the number of satellites to be calculated (that is, the number of the satellite signals), or setting the number of data to be obtained (that is, the number of time differences).

For setting the number of the satellites to be calculated, after all the time differences of code delays of a satellite signal from a satellite are calculated, first, it may be decided whether the number of satellites has reached the number of satellites to be calculated. If so, continue to perform step 340, so as to average all the obtained time differences to obtain a mean value. If not, continue to search a next satellite 214 (step 380), and then return to step 310 to receive a satellite signal from a satellite 214.

Furthermore, a plurality of code delays of a satellite signal from the satellite 214 is then calculated at the same fixed time interval (step 320), and time differences between all adjacent two code delays are calculated to obtain the plurality of time differences (step 330). Next, it is decided again whether the number of satellites to be calculated is reached. If so, continue to perform step 340, so as to average all obtained time differences to obtain a mean value. If not, continue to search a next satellite 216/218 (step 380), and then return to perform step 310, step 320, step 330, and step 370. Repeat the steps in such a manner. Continue to perform step 340 only after the number of satellites to be calculated is reached, so as to average all the obtained time differences to obtain the mean value.

For setting the number of data to be obtained, after all time differences of code delays of a satellite signal from a satellite are calculated, it may be decided first whether the number of the calculated time differences has reached a predetermined number (i.e., greater than or equal to the predetermined number). If so, continue to perform step 340, so as to average all the obtained time differences to obtain a mean value. If not, continue to search the next satellite 214 (step 380), and then return to step 310 to receive a satellite signal from the satellite 214.

Furthermore, the plurality of code delays of the satellite signal from the satellite 214 is calculated at the same fixed time interval (step 320), and the time differences between all the adjacent two code delays are calculated to obtain the plurality of time differences (step 330). Next, it is decided again whether the number of the calculated time differences has reached the predetermined number. If so, continue to perform step 340, so as to average all the obtained time differences to obtain a mean value. If not, continue to search the next satellite 216/218 (step 380), and then return to perform step 310, step 320, step 330, and step 370. Repeat the steps in such a manner. Continue to perform step 340 only after the number of the calculated time differences has reached the predetermined number, so as to average all the obtained time differences to obtain the mean value.

Furthermore, for step 320, the number of code delays to be obtained for each satellite 212/214/216/218, or the time range of the code delays to be calculated may be preset. Next, in step 320, according to the preset number of code delays to be obtained, the predetermined number of code delays of this satellite is obtained at the fixed time interval. Or, according to the preset time range of code delays to be calculated, the code delays in the preset time range of this satellite are obtained at the fixed time interval.

Here, the method for obtaining a precise sampling frequency of a GPS according to the present invention may be implemented by embedding a software program or a firmware program in the storage unit 130 of the GPS receiver 100, and executing the embedded software program or firmware program by a processor 150 of the GPS receiver 100. The storage unit 130 may be implemented as one or more memories.

When the method for obtaining a precise sampling frequency of a GPS according to the present invention is embedded in the GPS receiver 100 in the form of the software or firmware program, the calculation of the new sampling frequency may be started in the manner of timing or specific condition (for example, conditions such as power supply reset, that is, replacing battery) triggering, so as to ensure that the new sampling frequency stored in the storage unit 130 is the precise sampling frequency. Options may also be designed for a user to start to perform the calculation of the new sampling frequency.

Figure 4:
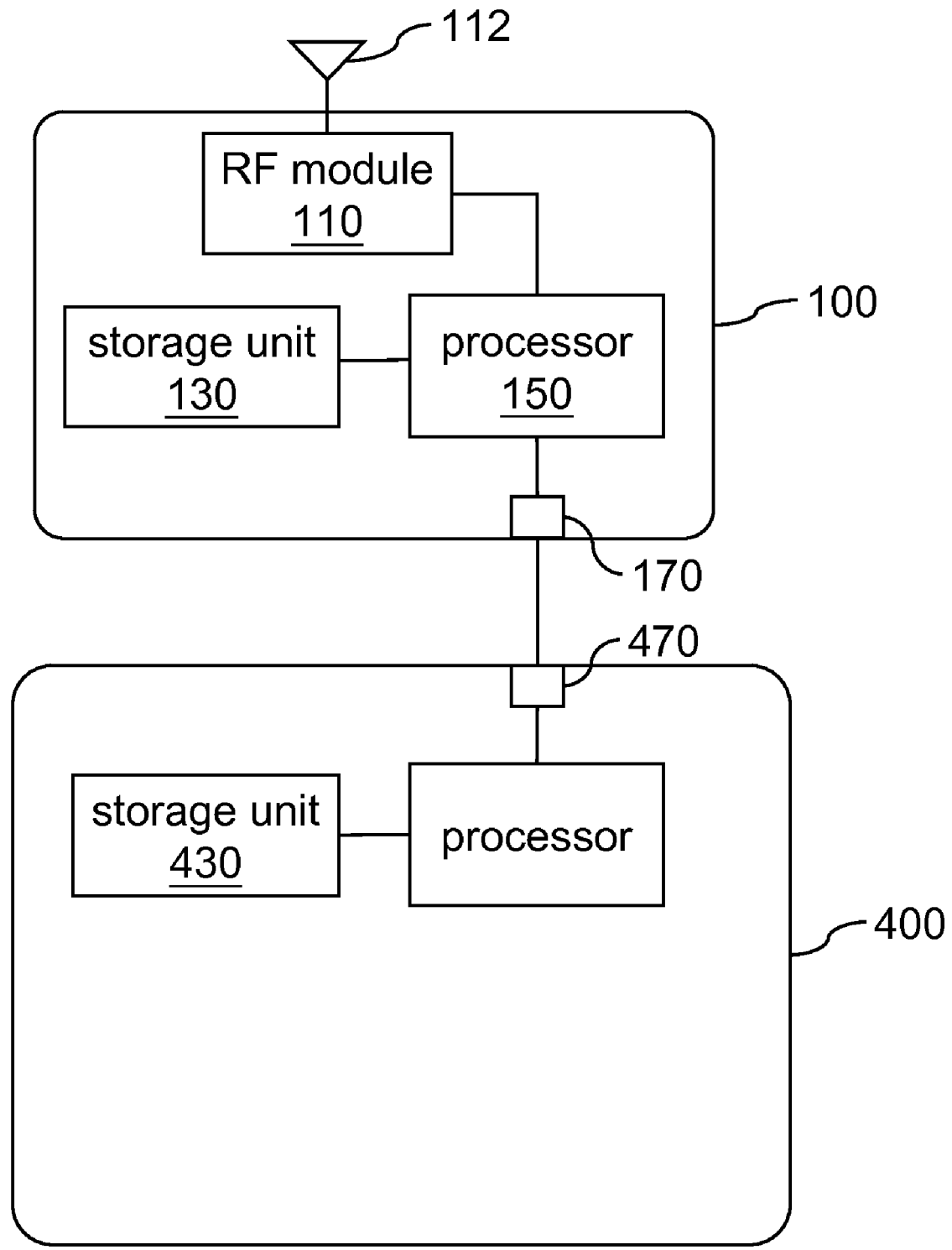
FIG. 4 shows a GPS receiver in which the other embodiment of the present invention is applied.

In addition, referring to FIG. 4, the method for obtaining a precise sampling frequency of a GPS according to the present invention may also be installed as a software program in a stand alone computer 400, that is, be installed and stored within a storage unit 430. Signal communication between the GPS receiver 100 and the external computer 400 may be connected directly or indirectly by a signal connection port 170 of the GPS receiver 100 and a corresponding signal connection port 470 in the computer 400. Next, the software program installed in the external computer 400 is executed to utilize the RF module 110 of the GPS receiver 100 to accomplish the calculation of the new sampling frequency, and further to store the calculated new sampling frequency in the storage unit 130 of the GPS receiver 100, such that the GPS receiver 100 may use this new sampling frequency for various satellite tracking and positioning.

In conclusion, when the method for obtaining a precise sampling frequency of a GPS according to the present invention is applied in the GPS receiver, the more precise sampling frequency relative to the designated sampling frequency given in the specification may be provided for the GPS receiver, such that the GPS receiver may perform sampling of the satellite signal with a correct sampling frequency directly. In other words, the GPS receiver in which an embodiment of the present invention is applied may search samplings of the satellite signal with a more precise sampling frequency. In such a manner, satellite tracking time of the GPS receiver may be effectively shortened and more precise time information may be obtained. Moreover, the GPS receiver may use precise sampling frequency directly to perform more diversified satellite tracking modes, for example, hopping satellite tracking, rapidly searching a code delay range during a warm start or hot start of the GPS receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for obtaining a precise sampling frequency of a global positioning system (GPS), applied in a GPS receiver having a radio frequency (RF) circuit, the method comprising:
   receiving at least one satellite signal from at least one satellite by using the RF circuit;
   calculating a plurality of code delays of the satellite signal at a fixed time interval;
   calculating time differences between all adjacent two code delays among the plurality of code delays to obtain a plurality of time differences;
   calculating a mean value of all the obtained time differences;
   calculating a ratio between 1000 times of the mean value and the fixed time interval to obtain an error value; and
   adding the error value to a standard sampling frequency of the RF circuit to obtain a new sampling frequency.

2. The method for obtaining a precise sampling frequency of a GPS according to claim 1, wherein the fixed time interval is 1 ms.

3. The method for obtaining a precise sampling frequency of a GPS according to claim 1, further comprising:
   storing the obtained new sampling frequency.

4. The method for obtaining a precise sampling frequency of a GPS according to claim 1, wherein the standard sampling frequency is a designated sampling frequency given in a specification of the RF circuit.

5. The method for obtaining a precise sampling frequency of a GPS according to claim 1, wherein when multiple satellites exist, the step of using the RF circuit to receive at least one satellite signal from at least one satellite further comprises a step of using the RF circuit to receive satellite signals from different satellites at different time points.

* * * * *